United States Patent Office 3,657,452
Patented Apr. 18, 1972

3,657,452
3,4 - DICARBETHOXY-β-PHENETHYLCARBAMIC ACID, ETHYL ESTER IN TREATING PARKINSONISM
Irwin L. Klundt, Brookfield, and Robert Lenga and Edward J. Warawa, Milwaukee, Wis., assignors to Aldrich Chemical Company, Milwaukee County, Wis.
No Drawing. Filed Dec. 9, 1970, Ser. No. 96,617
Int. Cl. A61k 27/00
U.S. Cl. 424—300
2 Claims

ABSTRACT OF THE DISCLOSURE

Methods of treating the symptoms of Parkinsonism comprising administering a therapeutically effective amount of 3,4-dicarbethoxy-β-phenethylcarbamic acid, ethyl ester to patients in need of such treatment.

BACKGROUND OF THE INVENTION

Until recently, patients suffering from Parkinsonism were treated with anticonvulsants, antispasmodics, central nervous system stimulants, and the like, in an attempt to produce temporary amelioration of their complaints. In severe cases, surgical procedures were employed with some success. L-Dopa was the first single agent found to be effective in reversing the akinesia and rigidity of Parkinsonism, particularly in severe cases. An increase in mental alertness and wakefulness, relief from depression and an increase in intellect has also been observed in patients receiving L-Dopa.

While L-Dopa has produced some rather promising results in experimental therapy and is being used in a limited number of patients, it is not well tolerated by a number of patients. The most frequent side effects are nausea, vomiting, postural hypotension, cardiac dysrhythmia and choreiform movements. The abnormal, involuntary movements pose severe problems to the drug's continued use in approximately 50% of the patients. Furthermore, dopamine itself is not orally active and has a very short duration of action. Thus, the search for more effective orally, long-acting and anti-Parkinson agents continues. It is an object of the present invention to provide such an agent, and to provide methods for treating the symptoms of Parkinsonism.

DISCLOSURE 3,4-dicarbethoxy-β-phenethylcarbamic acid, ethyl ester is represented by the structural formula

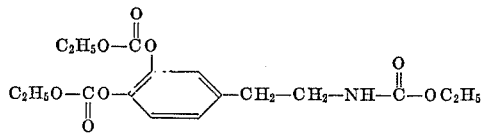

The compound can be prepared according to the method described in CA:69 32631 h (1968). No utilities have previously been reported for the compound. It has now been found that the compound exhibits anti-Parkinsonism activity in test animals in dosages of from 25 to 200 mg./kg. of body weight daily.

The anti-Parkinson activity of the above compound was established in several species of test animals using Harmonyl® (deserpidine) Antagonism Test. In the test, mice are dosed orally with 50 mg./kg. of deserpidine 24 hours prior to drug evaluation. In test animals, deserpidine produces ptosis, hunched posture, sedation, catalepsy and rigidity. L-Dopa produces marked reversal of the above effects.

3,4-dicarbethoxy-β-phenethylcarbamic acid, ethyl ester produced moderate to marked reversal of the deserpidine effects in mice at dosages of from 50–200 mg./kg. orally, and at 100 mg. i.p. The compound further produces moderate to marked reversal of the deserpidine effects in monkeys at dosages of from 25 to 100 mg./kg. orally. Additional tests in rabbits indicated activity at dosages of from 25 to 100 mg./kg. i.v. in the caudate nucleus test.

The compounds are generally administered to mammalian Parkinsonism patients in dosages of from 25 to 200 mg./kg. of body weight daily, preferably in divided doses. While the compounds exhibit both oral and parenteral activity, the preferred route of administration is the oral route. The oral $LD_{50}$ of the compound of this invention in mice is greater than 1000 mg./kg.

The compound useful in the practice of the present invention is generally formulated into pharmaceutical compositions comprising, as an active ingredient, at least one of tht active agents in association with a pharmaceutical carrier or diluent. The compound useful in the practice of the invention exhibits both oral and parenteral activity and can be formulated in dosage forms for oral or parenteral administration.

Solid dosage forms for oral administration include capsules, tablets, pills, powders and granules. In such solid dosage forms, the active compound is admixed with at least one inert diluent such as sucrose, lactose or starch. Such dosage forms can also comprise, as is normal practice, additional substances other than inert diluents, e.g., lubricating agents such as magnesium stearate. In the case of capsules, tablets and pills, the dosage forms may also comprise buffering agents. Tablets and pills can additionally be prepared with enteric coatings.

Liquid dosage forms for oral administration include, pharmaceutically acceptable emulsions, solutions, suspensions, syrups, and elixirs containing inert diluents commonly used in the art, such as layer. Besides inert diluents, such compositions can also include adjuvants, such as wetting agents, emulsifying and suspending agents, and sweetening, flavoring and perfuming agents.

Preparations according to this invention for parenteral administration include sterile aqueous or non-aqueous solutions, suspension or emulsions. Examples of non-aqeuous solvents or vehicles are propylene glycol, polyethylene glycol, vegetable oils, such as olive oil and injectable organic esters such as ethyl oleate. Such dosage forms may also contain adjuvants such as preserving, wetting, emulsifying and dispersing agents. They may be sterilized by, for example, filtration through a bacteria-filter, by incorporating sterilizing agents into the compositions, by irradiating the compositions, or by heating the compositions. They can also be manufactured in the form of sterile solid compositions which can be dissolved in sterile water, or some other sterile injectable medium immediately before use.

The dosage of active ingredient in the compositions of this invention may be varied; however, it is necessary that the amount of the active ingredient shall be such that a suitable dosage form is obtained. The selected dosage depends upon the desired therapeutic effect, on the route of administration, and on the duration of the treatment.

We claim:

1. A method of treating the symptoms of Parkinsonism in a patient comprising administering a therapeutically effect amount of 3,4-dicarbethoxy-β-phenethylcarbamic acid, ethyl ester to a patient, having Parkinsonism.

2. A method in accordance with claim 1 wherein the compound is administered to a patient in dosages of from 25 to 200 mg./kg. of body weight daily.

References Cited

Chem. Abst. 69, 35631 h (1968).

STANLEY J. FRIEDMAN, Primary Examiner